Feb. 12, 1952     D. G. C. LUCK     2,585,565
INDICATING SYSTEM
Filed Dec. 1, 1950
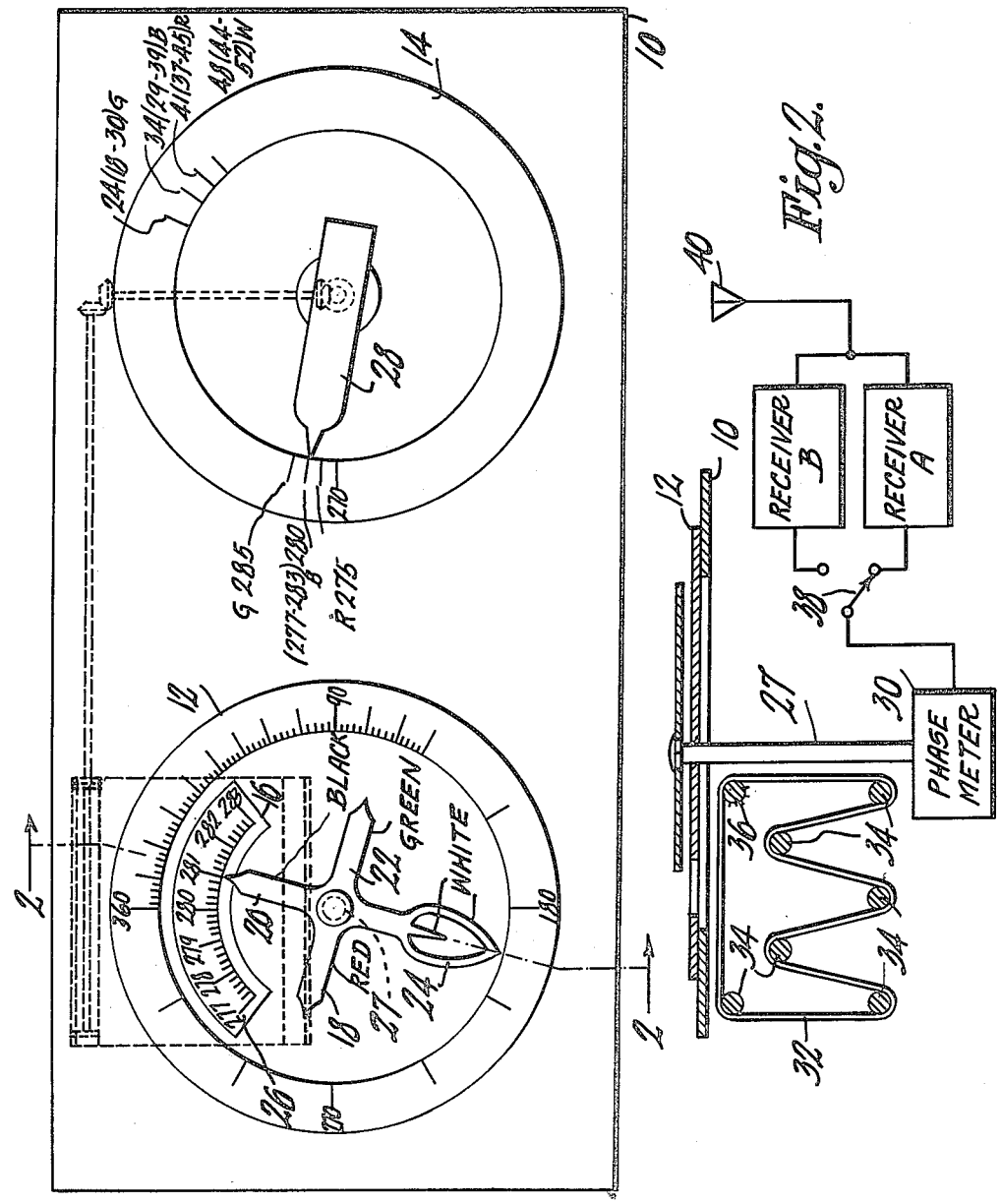
INVENTOR
David G. C. Luck
BY
J. L. Whittaker
ATTORNEY Patented Feb. 12, 1952

2,585,565

UNITED STATES PATENT OFFICE 2,585,565

INDICATING SYSTEM

David G. C. Luck, Princeton, N. J., assignor to Radio Corporation of America, a corporation of Delaware Application December 1, 1950, Serial No. 198,509

13 Claims. (Cl. 177—351)

1

This invention is related to indicating systems.

Applicant's prior copending application, Serial No. 718,219, filed December 24, 1946, entitled "Radio Aids to Navigation," now Patent No. 2,536,509, issued January 2, 1951, describes a novel omnidirectional radio range system. This new system affords a higher degree of sensitivity and sharpness of bearing indication than has been heretofore generally available for omnidirectional range indicators. One of the problems associated with the novel omnidirectional range system is that of providing an especially suitable indicator system. The application above-mentioned suggests an antenna array having several lobes which are in effect angularly moved each through a small sector as the phase of the signals to the antennas is changed. For any aircraft within any sector swept by one of these lobes an apparent modulation is produced of the received radio frequency signal. This modulation may be compared in phase with a superimposed modulation of the same frequency to give a fine bearing. Unfortunately, the sectors are of different angular extent, making instrument calibration difficult. It is also known in conventional omnidirectional radio ranges to rotate a single major lobe by varying the phase of signals fed to an antenna array thereby making possible a unique determination of the bearing of an aircraft by comparison of the phase of the apparent modulation of the received signal with a superimposed modulation. In the above-mentioned prior application it is suggested that the novel omnidirectional range system be used in conjunction with the conventional system, the latter being used to determine the general sector or to identify the sector in which the airplane is located, and the former being used to obtain a fine bearing reading. It will be understood from the description of the new omnidirectional range system that the fine bearing indications are unique only within a particular sector, any given reading being found at one azimuth within each such sector.

It is an object of the present invention to provide a novel indicator system.

It is another object of the invention to provide an indicator system especially useful for obtaining bearing indications of high accuracy when a conventional omnidirectional range system and the novel system above-mentioned are used in conjunction with each other.

Another object of the invention is to provide an indicator system suitable for the ready reading of an instrument which is calibrated to widely different standards.

A further object of the system is to provide an indicator system for coarse and fine readings taken by the same instrument or meter and affording ready identification of the portion of the coarse reading to which the fine reading pertains.

2

These and other objects, advantages, and novel features of the invention will be more apparent from the following description when taken in connection with the accompanying drawing in which like reference numerals refer to like parts and in which:

Fig. 1 is a face view of a typical instrument panel of an aircraft or the like in which the indicating system of the invention is employed; and Fig. 2 is a cross-sectional view along the lines 2—2 of Fig. 1 and also including a partially schematic diagram of an aircraft omnidirectional range system embodying the invention.

In accordance with the invention, a plurality of pointers are driven over a dial area under which the dials may be selectively driven into place. Each dial cooperates with one and practically only one pointer although there may be some overlap and there may be more than one dial for each pointer. The dials and pointers are coded so that the proper dials are read each with its proper pointer and so that the operator may readily identify a selected dial as cooperating with the pointer in place. In the preferred embodiment of the invention herein illustrated, a plurality of pointers are mounted on a single meter shaft. One of the pointers may be a coarse reading pointer which cooperates with a coarse dial. All of the pointers cooperate with fine reading dials which are driven into place under an apertured area in the coarse dial. When conditions are such that a coarse reading is to be taken on the phase meter a shaft of which drives all the pointers, the coarse reading is read with the coarse pointer against the coarse dial. When conditions are such that a fine reading is to be taken, that selected dial is driven into place which is to be read with the particular pointer then over the fine reading area. The fine reading dials and the pointers are color coded to assist in the proper identification of which dial is properly read with which pointer. By this means, the same phase meter may be employed for securing coarse readings with the conventional omnidirectional range system and fine readings with the novel system of my aforesaid application, by simple manipulation of the fine dial drive and by actuating a switch.

It will be understood that the conventional system radiation pattern may be established at one radio frequency and that of the novel range system at a different radio frequency, but both employing the same modulation frequency. When a coarse reading is to be taken, the switch is operated in one position, and conditions are changed by operating the switch in another position; the phase meter is thus supplied respectively either with signals from the conventional omnidirectional range system or from that of the novel range system, and the meter is differently calibrated for the two conditions. The system thereby effects simplicity of operation, a saving of components, and a compactness of arrangement which is highly useful especially in taking omnidirectional range readings employing both the conventional and the novel systems.

Referring now more particularly to Fig. 1, the instrument panel of an aircraft may include a plate 10 on which are marked a coarse dial 12 and a selector dial 14. Both of these dials are graduated in degrees. The coarse dial 12 is marked at 2° intervals and laid out in compass fashion. In the coarse dial 12 is an aperture 16 over an area which is the fine reading area. A plurality of pointers 18, 20, 22, and 24 are mounted on a single shaft 27. The pointer 24 is a coarse reading pointer which is mounted to cooperate with the coarse reading dial 12. All of the pointers 18, 20, 22, and 24 are also mounted to be read with the fine reading dials, which are driven into place under the area 16. One of these fine dials 26 is shown in place in Fig. 1 to be read with pointer 20. The pointers 18, 20, 22, and 24 are colored red, black, green, and white, respectively. The selector dial 14 has associated with it a pointer 28. In the embodiment shown, the pointer 28 is arranged to be positioned manually and connected to drive the various fine reading dials such as 26 into place. Some of the calibration on the dials is illustrated by lead lines. In practice the numerals would of course be engraved or marked on the dials along side of the scale division marks. There is marked either the center of the scale range, or the scale range, or both against the marks on selector dial 14. A complete tabulation of these scale markings and range for a system employing the novel omnidirectional range system of my aforesaid application is as follows:

| Scale Center (Degrees) | Scale Range (Degrees) | Color |
| --- | --- | --- |
| 24 | 18–30 | Green. |
| 34 | 29–39 | Black. |
| 41 | 37–45 | Red. |
| 48 | 44–52 | White. |
| 54 | 50–58 | Green. |
| 60 | 56–64 | Black. |
| 65 | 62–68 | Red. |
| 70 | 67–73 | White. |
| 75 | 72–78 | Green. |
| 80 | 77–83 | Black. |
| 85 | 82–88 | Red. |
| 90 | 87–93 | White. |
| 95 | 92–98 | Green. |
| 100 | 97–103 | Black. |
| 105 | 102–108 | Red. |
| 110 | 107–113 | White. |
| 115 | 112–118 | Green. |
| 120 | 116–124 | Black. |
| 126 | 122–130 | Red. |
| 132 | 128–136 | White. |
| 139 | 135–143 | Green. |
| 146 | 141–151 | Black. |
| 156 | 150–162 | Red. |
| 204 | 198–210 | Green. |
| 214 | 209–219 | Black. |
| 221 | 217–225 | Red. |
| 228 | 224–232 | White. |
| 234 | 230–238 | Green. |
| 240 | 236–244 | Black. |
| 245 | 242–248 | Red. |
| 250 | 247–253 | White. |
| 255 | 252–258 | Green. |
| 260 | 257–263 | Black. |
| 265 | 262–268 | Red. |
| 270 | 268–273 | White. |
| 275 | 272–278 | Green. |
| 280 | 277–283 | Black. |
| 285 | 282–288 | Red. |
| 290 | 287–293 | White. |
| 295 | 292–298 | Green. |
| 300 | 296–304 | Black. |
| 306 | 302–310 | Red. |
| 312 | 308–316 | White. |
| 319 | 315–323 | Green. |
| 326 | 321–331 | Black. |
| 336 | 330–342 | Red. |

The gaps between center scale readings of 156 and 204 degrees, and between 336 and 24 degrees is due to the fact that the fine readings are not available throughout 360°. If these are desired, still a third carrier frequency and receiver for it are required. The scale can then readily be completed for the gaps. Switching between the two receivers for fine reading frequencies must then be suitably correlated with the position of selector pointer 28 to avoid taking a fine reading with the incorrect frequency. For convenience in description, only one receiver has been considered herein as employed for fine reading. The employment of more than one will then be obvious.

Referring now also to Fig. 2, as well as Fig. 1, the shaft 27 is actuated by a phase meter 30. With four equally spaced pointers 18, 20, 22, 24, on shaft 27, opening 16 is chosen to extend a little over a quadrant. A flexible material 32 has imprinted upon it the various fine dials such as 26 and is distributed upon various rollers 34 and a sprocketed roller 36. It will be understood that the arrangement of the flexible material is such as to allow a large number of fine reading dials imprinted on the material 32 to be arranged in a compact space. The sprocketed roller 36 engages with perforations in the material 32 and is driven through mechanical gearing (as shown in Fig. 1) by the selector pointer 28. By a switch 38, the phase meter 30 may be selectively connected to either one of two receivers, receiver A or receiver B. Both of the receivers are connected to an antenna 38 on which the omnidirectional range signals may be received.

In operation, let it be assumed that the switch 34 is in position to connect receiver A to the phase meter 30. Receiver A is tuned to the carrier frequency of the conventional omnidirectional range system. In this condition of the apparatus, the shaft 27 drives the arms so that the arm 24 indicates a bearing or directional range with respect to the transmitting system. This directional range may be directly read in degrees of azimuth on the dial 12 of Fig. 1. Let it be supposed that the reading so taken is at or near 280°. At this point it is desired by the operator to take a fine reading. The operator then turns the switch 38 to connect receiver B to phase meter 30. Receiver B is tuned to the carrier frequency of the novel omnidirectional range system as disclosed in my aforesaid application. In this condition of the apparatus one or the other of the pointers 18, 20, 22, or 24 will be over the fine reading area 16. The operator next selects that particular dial to be read in cooperation with the pointer which corresponds in coding by color and is nearest to the coarse reading previously taken. Thus, the dial 26 is black and is the nearest to the coarse reading of 280°. The operator therefore recognizes that the black fine dial is the one to be read in cooperation with the black pointer 20. Detents (not shown) may be provided so that the dial 28 tends to stop at suitable intervals at which the fine reading dials such as 26 are brought into correct position under the fine reading area 16. The modulating frequency employed as reference frequency and also as the modulation resulting from motion of the antenna array patterns may be the same frequency both for the conventional omnidirectional range system employed with receiver A and the fine reading system employed with receiver B. Thus no change at all in the phase meter 30 is required in the two conditions of the apparatus. However, it will readily be observed that the indicator system of the invention is equally suitable for use where any single meter is to be used for securing fine and coarse reading. The fine reading dials such as 26 could not conveniently be marked or engraved upon the panel 10 in fixed position, first because there are too many of them for convenient reading, and secondly because they are non-linear and would be likely to cause confusion. It is desirable that the opening or fine reading area 16 be arranged so that at the extreme readings on any of the fine reading dials such as 26 there is some overlap so that a reading may be taken on the adjacent fine reading dial. The selector dial pointer 28 may be arranged to be stepped along, as the receiving craft moves in azimuth, by a Geneva movement or the like (not shown) connected between the shaft 27 and the selector pointer 28. Thus, once the correct dial selection has been made by the operator, further use of the same fine facility may be automatic. Instead of the wound webbing 32, it will also be obvious that a single large cylinder might be used if desired. However, the flexible material is preferred, as leading to a more compact device. It will also be noted that the material is arranged to drive the fine reading dials such as 26 into position in a direction radial to the shaft 27. This arrangement is more conducive to the accurate positioning of the fine reading dials such as 26 than a tangential motion would be, and tends to avoid errors which might be due to the detents (if any) in not properly locating the shaft sprocketed drive member 36.

It will be apparent that the indicator system of the invention permits full use to be made of instrumentation such as a phase meter, that it makes possible the more compact construction of equipment, and greater flexibility thereof in use.

What is claimed is:

1. An indicator system comprising a plurality of pointers mounted to move one by one over an area under which a reading may be taken against a dial, a plurality of dials one to cooperate with each pointer by being brought one by one into place under said area, and a drive to bring said dials selectively into place, said pointers and said dials each being coded to show the correspondence between any pointer and a cooperating dial, whereby an operator may readily identify a selected dial when driven under said area under a cooperating pointer as cooperating therewith.

2. The system claimed in claim 1, said pointers being fixed with respect to each other.

3. The system claimed in claim 1, there being more than one dial to cooperate with each said pointer.

4. An indicator system comprising a shaft, a plurality of pointers mounted for rotation on said shaft and angularly spaced thereon, a plurality of dials one to cooperate with each pointer by being brought one by one into place under a sectoral area over which said dials rotate, a drive to bring said dials into place, said pointers and said dials each being coded to show the correspondence between any pointer and a cooperating dial, whereby an operator may readily identify a selected dial when driven under said area under a cooperating pointer as cooperating therewith.

5. The indicator system claimed in claim 4, said code comprising a different color with which each said pointer is colored and a corresponding color coloring those of said dials cooperating with each said pointer.

6. The indicator system claimed in claim 4, there being more than one dial for each said pointer.

7. An indicator system comprising a shaft, a plurality of pointers mounted for rotation on said shaft and angularly spaced thereon, a plurality of dials one to cooperate with each pointer for a fine reading by being brought one by one into place under a sectoral area over which said dials rotate, there being more than one dial for some of said pointers, a drive to bring said dials into place, a coarse selector indicator attached to said drive having a coarse scale range corresponding to the readings of all dials with all pointers, said pointers and said dials being coded whereby an operator may readily identify a selected dial when driven under a cooperating pointer as cooperating therewith and may be further assured of the proper fine reading being taken by aid of the coarse reading of said coarse selector indicator.

8. An indicator system as claimed in claim 7, further comprising a shield covering the area over which said pointers rotate and having an aperture under said sectoral area, a flexible material arranged on rollers and having thereon said dials, said drive comprising one of said rollers carrying said material and geared to said coarse indicator, said drive being manually operable.

9. An indicator system comprising a meter having a plurality of pointers mounted fixedly with respect to each other and to move selectively one by one over a fine reading area under which a reading may be taken against a fine dial, the motion of said pointers being responsive to the phase of an input voltage with reference to an applied standard signal of the same frequency, a coarse dial to cooperate with one only of said pointers and underlying the entire area over which said one pointer moves, a plurality of fine dials one to cooperate with each said pointer by being brought selectively into place under said fine reading area, said pointers and said dials each being coded to show the correspondence between any pointer and a cooperating dial, a switch, means to apply a standard signal of one frequency to said phase detector, means to derive two different voltages of the same said frequency the phase of one of which with reference to said standard signal determines a coarse reading and the phase of the other of which with reference to said standard signal determines a fine reading, said switch having two conditions one applying one of the derived voltages as input to said phase detector, the other condition applying the other derived voltage as input to said phase detector, whereby a coarse reading may be taken with the switch applying one of said voltages to said phase detector and the operator may readily recognize by the coding the proper fine dial to cooperate with the pointer over said fine reading dial for the switch in said other condition to derive a fine reading.

10. The system claimed in claim 9, said phase detector comprising a shaft the rotation of which is directly proportional to the phase of the input voltage with respect to said standard signal, said pointers being mounted on said and angularly spaced on said shaft, said coarse dial being calibrated over 360° of rotation of said coarse pointer, said fine reading area being a sectoral area around said shaft, said coarse dial having an aperture under said sectoral area, under which aperture said fine dials are selectively brought into place.

11. The system claimed in claim 10, further including a drive to bring said fine dials into place, a second coarse pointer attached to said drive and a second coarse dial with which said pointer is calibrated in correspondence to the calibration of said one phase detector coarse pointer and dial, whereby with the switch applying said one voltage to said phase detector, the operator may take a coarse reading and transfer said reading to said second coarse pointer and dial thereby bringing substantially into place through said drive the proper fine reading dial and then by switching to the other switch condition take a fine reading, identifying the proper fine dial by the said coding.

12. An indicator system for a meter having a single drive for both coarse and fine readings of different calibrations and having means selectively to connect said drive to be driven for the purpose of making one of these types of readings, and comprising a plurality of pointers mounted to move one by one over an area under which a fine reading may be taken against a dial, a coarse reading dial over which one of said pointers is driven and cooperating therewith for taking coarse readings, a second drive to bring said fine reading dials selectively into place, said pointers and said dials being coded to show the correspondence between any pointer and a cooperating dial, whereby an operator may readily identify a dial when driven under said area under a cooperating pointer as cooperating therewith, and whereby the fine reading dial may be driven into place in accordance with a reading taken with said means connected for coarse reading and then a fine reading taken with said means connected for a fine reading.

13. The system claimed in claim 12, said meter drive including a shaft on which single shaft all said pointers are mounted.

DAVID G. C. LUCK.

REFERENCES CITED

The following references are of record in the file of this patent:

UNITED STATES PATENTS

| Number | Name | Date |
|---|---|---|
| 2,132,094 | Brodton | Oct. 4, 1938 |
| 2,154,066 | De Giers | Apr. 11, 1939 |
| 2,466,558 | Sadlon | Apr. 6, 1499 |